United States Patent
Li et al.

(10) Patent No.: US 9,803,094 B2
(45) Date of Patent: Oct. 31, 2017

(54) AQUEOUS INK-JET INKS CONTAINING MIXTURES OF ANIONIC AND NON-IONIC POLYMERIC BINDERS

(71) Applicant: E I DU PONT DE NEMOURS AND COMPANY, Wilmington, DE (US)

(72) Inventors: Xiaoqing Li, Newark, DE (US); Scott W Ellis, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 326 days.

(21) Appl. No.: 14/367,349

(22) PCT Filed: Dec. 18, 2012

(86) PCT No.: PCT/US2012/070420
§ 371 (c)(1),
(2) Date: Jun. 20, 2014

(87) PCT Pub. No.: WO2013/096344
PCT Pub. Date: Jun. 27, 2013

(65) Prior Publication Data
US 2015/0218397 A1    Aug. 6, 2015

(51) Int. Cl.
| | | |
|---|---|---|
| C08G 18/08 | (2006.01) |
| C08G 18/44 | (2006.01) |
| C08G 18/48 | (2006.01) |
| C08G 18/66 | (2006.01) |
| C08G 18/75 | (2006.01) |
| C09D 11/03 | (2014.01) |
| C09D 11/10 | (2014.01) |
| C09D 11/102 | (2014.01) |
| C09D 11/107 | (2014.01) |
| C09D 11/322 | (2014.01) |
| C09D 11/326 | (2014.01) |
| C09D 175/04 | (2006.01) |

(52) U.S. Cl.
CPC ........ C09D 11/322 (2013.01); C08G 18/0823 (2013.01); C08G 18/44 (2013.01); C08G 18/4854 (2013.01); C08G 18/6692 (2013.01); C08G 18/755 (2013.01); C09D 11/03 (2013.01); C09D 11/10 (2013.01); C09D 11/102 (2013.01); C09D 11/107 (2013.01); C09D 11/326 (2013.01); C09D 175/04 (2013.01)

(58) Field of Classification Search
CPC ....... C09D 11/322; C09D 11/03; C09D 11/10; C09D 11/102; C09D 11/107; C09D 11/326; C09D 175/04; C08G 18/0823; C08G 18/44; C08G 18/4854; C08G 18/6692; C08G 18/755
See application file for complete search history.

(56) References Cited

U.S. PATENT DOCUMENTS

| | | | | |
|---|---|---|---|---|
| 4,701,480 A | * | 10/1987 | Markusch | .......... C08G 18/0819 523/340 |
| 5,085,698 A | | 2/1992 | Ma et al. | |
| 5,272,201 A | | 12/1993 | Ma et al. | |
| 5,554,739 A | | 9/1996 | Belmont | |
| 6,852,156 B2 | | 2/2005 | Yeh et al. | |
| 2003/0128246 A1 | | 7/2003 | Redding et al. | |
| 2003/0160851 A1 | | 8/2003 | Baccay et al. | |
| 2005/0182154 A1 | | 8/2005 | Berge et al. | |
| 2007/0056118 A1 | | 3/2007 | Ellis | |
| 2007/0060670 A1 | | 3/2007 | Ellis | |
| 2009/0306285 A1 | | 12/2009 | Li et al. | |
| 2010/0143589 A1 | | 6/2010 | Spinelli et al. | |

OTHER PUBLICATIONS

International Search Report for PCT/US12/70420, dated Feb. 12, 2013 by the USPTO.

* cited by examiner

Primary Examiner — Patrick Niland
(74) Attorney, Agent, or Firm — Simon L. Xu

(57) ABSTRACT

The present disclosure provides aqueous ink-jet inks having improved salt stability containing an aqueous vehicle, a colorant, and a mixture of a water-borne anionic polymeric binder and a water-borne non-ionic polymeric binder.

21 Claims, No Drawings

AQUEOUS INK-JET INKS CONTAINING MIXTURES OF ANIONIC AND NON-IONIC POLYMERIC BINDERS

CROSS REFERENCE TO RELATED APPLICATIONS

This application claims priority under 35 U.S.C. §119 from U.S. Provisional Application Ser. No. 61/577,911, filed Dec. 20, 2011 which is incorporated by reference in its entirety.

BACKGROUND OF THE DISCLOSURE

This disclosure relates to novel aqueous ink-jet inks having improved salt stability containing an aqueous vehicle, a colorant, and a mixture of a water-borne anionic polymeric binder and a water-borne non-ionic polymeric binder.

Ink-jet digital printing method is becoming increasingly important for the printing of textiles. It offers a number of potential benefits over conventional printing methods such as screen printing. Digital printing eliminates the set-up expense associated with screen preparation and can potentially enable cost-effective short run production. Digital printing furthermore allows visual effects, such as tonal gradients and repeat of printed patterns that cannot be practically achieved with a screen printing process. Especially beneficial is the ease in changing the patterns of originals during production of digital printing, when it is possible to respond to a change in patterns or other requirements within a short period of time.

U.S. Patent Application Publication No. 20070060670 discloses an aqueous white ink containing polyurethane binder for printing onto textile substrates. The textile substrates are pretreated with an inorganic salt solution. While pretreatment of the textile substrate with an inorganic salt solution can precipitate the white ink to prevent it from penetrating into the fabric, the inorganic salt solution can also interact with color inks causing them to precipitate and consequently compromise the printed color image. A need exists for highly stable ink-jet inks that can be printed on various substrates to form durable, high quality image. The present disclosure satisfies this need by providing an ink containing a mixture of a water-borne anionic polymeric binder and a water-borne non-ionic polymeric binder. The presence of an non-ionic polymeric binder in an ink reduces the interaction of the ink with salt(s) that are present in the print substrate, and consequently improves the quality of printed images.

SUMMARY OF THE DISCLOSURE

An embodiment of the present disclosure provides an aqueous ink-jet ink having improved salt stability comprising an aqueous vehicle, a colorant, and a mixture of a water-borne anionic polymeric binder and a water-borne non-ionic polymeric binder, wherein the anionic polymeric binder is a polyurethane, and the non-ionic polymeric binder is selected from the group consisting of polyurethane, polyethylene-vinylacetate, acrylics, polyamide, polystyrene-acrylate, and mixtures thereof.

Another embodiment provides that the non-ionic polymeric binder is polyurethane.

Another embodiment provides that the anionic polymeric binder is cross-linked with a cross-linking agent.

Another embodiment provides that the ink further comprises a polymeric dispersant.

Another embodiment provides that the polymeric dispersant is polyurethane.

Another embodiment provides that the ink is printed onto textile.

Another embodiment provides that the textile is treated by a pre-treatment fluid.

Another embodiment provides that the ink is under-printed with a white ink.

Another embodiment provides that the weight ratio of the anionic polymeric binder to the non-ionic polymeric binder is between 1:0.05 and 0.05:1 by weight.

Another embodiment provides that the weight ratio of the anionic polymeric binder to the non-ionic polymeric binder is between 1:0.1 and 0.1:1.

Yet another embodiment provides that the non-ionic polymeric binder is acrylic.

These and other features and advantages of the present embodiments will be more readily understood by those of ordinary skill in the art from a reading of the following Detailed Description. Certain features of the disclosed embodiments which are, for clarity, described above and below as a separate embodiment, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants. The polyurethane dispersants described herein are in fact dispersions themselves.

As used herein, the term "OD" means optical density.

As used herein, the term "aqueous vehicle" refers to water or a mixture of water and at least one water-soluble, or partially water-soluble (i.e. methyl ethyl ketone), organic solvent (co-solvent).

As used herein, the tem "ionizable groups," means potentially ionic groups.

As used herein, the term "substantially" means being of considerable degree, almost all.

As used herein, the term "MW" means weight average molecular weight.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term "NCO" means isocyanate.

As used herein, the term "cPs" means centipoise, a viscosity unit.

As used herein, the term "mN·m$^{-1}$" means milliNewtons per meter, a surface tension unit.

As used herein, the term "mPa·s" means millipascal second, a viscosity unit.

As used herein, the term "psig" means pounds square inch gauge, a pressure unit that does not include air pressure.

As used herein, the term "prepolymer" means the polymer that is an intermediate in a polymerization process, and can be considered a polymer.

As used herein, the term "AN" means acid number, mg KOH/gram of solid polymer.

As used herein, the term "PUD" means the polyurethanes dispersions described herein.

As used herein, the term "DTG" means direct to garment.

As used herein, the term "BMEA" means bis(methoxyethyl)amine.

As used herein, the term "DBTL" means dibutyltin dilaurate.

As used herein, the term "DMPA" means dimethylol propionic acid.

As used herein, the term "IPDI" means isophorone diisocyanate.

As used herein, the term "NMP" means n-Methyl pyrolidone.

As used herein, the term "TEB" means triethylene glycol monobutyl ether, a reagent supplied by Dow Chemical.

As used herein, the term "Sulfolane" means tetramethylene sulfone.

As used herein, the term "TAB-2" means Dainichiseika® TAB-2, a cyan pigment.

As used herein, Terathane® 650 is a polyether diol from Invista, Wichita, K.S.

As used herein, Etemacoll® UH-50 is a polycarbonate diol from UBE Industries, Tokyo, Japan.

As used herein, Denacol® 321 is trimethylolpropane polyglycidyl ether, a cross-linking reagent from Nagase Chemicals Ltd., Osaka, Japan.

As used herein, the term "EDA" means ethylene diamine.

As used herein, the term "TEA" means triethylamine.

As used herein, the term "TETA" means triethylenetramine.

As used herein, the term "THF" means tetrahydrofuran.

As used herein, Desmophene® C 1200 is a polyester carbonate diol from Bayer (Pittsburgh, Pa.).

As used herein, Byk®348 is a non-ionic surfactant from BYK Additives & Instruments, Germany.

As used herein, PrintRite® DP375 is a non-ionic polyurethane dispersion from Lubrizol (Wickliffe, Ohio).

As used herein, PrintRite® DP594 is a non-ionic acrylic emulsion from Lubrizol (Wickliffe, Ohio).

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise.

Binder

A binder is a polymeric compound or a mixture of polymeric compounds that is added to the ink formulation. The binder can impart properties to the final printed material that, for example, gives greater durability to the printed material. Typical polymers used as binders in ink-jet inks include polyurethane dispersions and polyurethane solutions, acrylics, styrene acrylics, styrene butadienes, styrene butadiene acrylonitriles, neoprenes, ethylene acrylic acids, ethylene vinyl acetate emulsions, latexes and the like. The binder may be a solution or stabilized as an emulsion by having ionic substituents such as carboxylic acids, sulfur containing acids, amine groups, and other similar ionic groups, and/or non-ionic hydrophilic substituents such as —$(CH_2CH_2O)_n$—, where n is an integer from 1 to 20. Binders that are soluble or dispersible in water and contain anionic substituents are called water-borne anionic binders. Binders that are soluble or dispersible in water predominantly due to presence of non-ionic hydrophilic substituents are called water-borne non-ionic binders. Anionic binders are commonly used in ink-jet inks, whereas this is not the case for most of non-ionic binders due to their poor water resistance properties. In the present disclosure, a mixture of water-born anionic binder(s) and water-born non-ionic binder(s) is employed and found to significantly improve the quality of printed images.

Non-Ionic Polymeric Binder

Suitable non-ionic binders include polyurethanes, polyethylene-vinylacetate, acrylics, polyamide, polystyrene-acrylate, and other non-ionic binders. One or more non-ionic binders may be used in an ink.

The non-ionic water-borne binder should be stable in the presence of multivalent cationic salts and form a stable solution or emulsion. If the non-ionic binder gels, or is not stable in the presence of a multivalent cationic salt solution, then it cannot be used as an ink additive. A screening test to determine whether a non-ionic binder is stable in the presence of a multivalent cationic salt solution is to mix a solution of 10 wt % polymer (on a dry basis) and a solution of 15 wt % of calcium nitrate tetrahydrate, and monitor to see whether the mixed solution/emulsion is stable. Visual observation of stability at ambient temperature (~25°) is taken at 10-minute and 24-hour intervals. The non-ionic component(s) on the binder must lead to a stable non-ionic binder/multivalent cationic solution/emulsion to be effective.

The non-ionic component(s) of the binder can come from the incorporation of a non-ionic hydrophilic or water soluble reactant into the binder. Examples of non-ionic components include ethylene oxide derivatives, acrylamide, hydroxyethyl-substituted monomers, vinylpyrrolidone, ethylenimines, and the like. The incorporation can occur during the polymerization step, or before, or after the polymerization step forming the binder. In the case where a non-ionic component is an ethylene oxide, the introduction of ethylene oxide can take the form of incorporating a glycol with sufficient (—CH$_2$—CH$_2$O—)$_n$ units to impart the non-ionic stability. For instance, a polyurethane may have an alkyl polyethylene glycol incorporated into the non-ionic polyurethane.

The non-ionic binder may also have ionic components incorporated into the polymer. For example, polyurethanes with ionic components such as acids may be used in the polyurethane reaction, and a specific acid example is dimethylolpropionic acid. For non-ionic binder substituted with acylamide and hydroxyethyl, the ionic source can come from (meth)acrylic acids. There are limits in the amount of ionic components in the non-ionic binder, because the ionic components may form complexes with multivalent cations leading to instability of the non-ionic binder/multivalent cationic solution. The balance of non-ionic and ionic components must lead to a stable solution as described above.

Anionic Polyurethane Binder

Suitable anionic polyurethane binders as ink additives are described in U.S. Patent Application Publication No. 20050182154, the disclosure of which is incorporated by reference herein for all purposes as if fully set forth.

The anionic polyurethane binder may be cross-linked. A cross-linked polyurethane refers to a polyurethane containing cross-linkable moieties that are cross-linked with a cross-linking agent, and these terms are understood by persons of ordinary skill in the art.

The cross-linked polyurethane binder may be stabilized in an ink's aqueous vehicle by having ionic substituents such as carboxylic acids, sulfur containing acids, and other similar ionic groups. More typically, the polyurethanes can be stabilized in the dispersion through incorporation of anionic functionalities, such as neutralized acid groups.

Suitable cross-linked polyurethanes are typically prepared by multi-step synthetic processes in which an NCO terminated prepolymer is formed. This prepolymer is added to water, or water is added to the prepolymer, to form a polymer dispersed in water (aqueous dispersion) that can subsequently undergoes chain extension reactions in the aqueous phase. The prepolymer can also be formed by a single-step process. Chain extension reactions can also be a single or multi-step process. Cross-linking can take place at any part during the single- or multi-step process.

Typically, cross-linking of the polyurethane binder is substantially completed prior to its addition to the ink formulation. Other applications of polyurethanes in an ink jet system may require that there is a component in the polyurethanes that can undergo cross-linking at the time of ink formulation, or more likely at the time of printing, or post treatment of the printed material. Alternatively, a cross-linking species can be added to affect the cross-linking at ink formulation time or later. Each of these processes can be described as a post-cross-linking system.

A stable aqueous dispersion of cross-linked polyurethane particles suitable for use as a binder additive has a dry polymer content of up to about 60% by weight, typically from about 15 to about 60% by weight, and more typically from about 30 to about 40% by weight, based on the total dispersion weight. However, it is always possible to dilute the dispersions to a concentration with any minimum solids content desired.

The means to achieve cross-linking of the polyurethane generally rely on at least one component of the polyurethane (starting material and/or intermediate) having three or more functional reaction sites. Reaction of these reaction sites produces a cross-linked polyurethane. When only two reactive sites are available on each reactive components, only linear (albeit possibly high molecular weight) polyurethanes are produced. Examples of cross-linking techniques include, but are not limited to, the following:

(a) the isocyanate-reactive moiety has at least three reactive groups, such as polyfunctional amines or polyol;
(b) the isocyanate has at least three isocyanate groups;
(c) the prepolymer chain has at least three reactive sites that can react via reactions other than the isocyanate reaction, for example with amino trialkoxysilanes;
(d) addition of a reactive component with at least three reactive sites to the polyurethane prior to its use in the ink-jet ink preparations, for example tri-functional epoxy cross-linkers;
(e) addition of a water-dispersible cross-linker with oxazoline functionality;
(f) synthesis of a polyurethane with carbonyl functionality, followed by addition of a dihydrazide compound; and
(g) any combination of the above cross-linking methods (a) through (f) and other cross-linking means known to those of ordinary skill in the relevant art.

The amount of cross-linking of the polyurethane to achieve the desired properties can vary over a broad range. While not being bound to theory, the amount of cross-linking is a function of the polyurethane composition, the whole sequence of reaction conditions utilized to form the polyurethane and other factors known to those of ordinary skill in the art. The extent of cross-linking, ink jet ink formulation, colorant, other inks in the ink-jet set, textile, post treatment exposure to heat and/or pressure, and printing technique for the textile, all contribute to the performance or quality of the final printed textile. Printing technique can include pre- and post-treatment of textile.

Based on techniques described herein, a person having ordinary skill in the art is able to determine, via routine experimentation, the cross-linking needed for a particularly type of polyurethane to obtain an effective ink jet ink for textiles.

The amount of cross-linking can be measured by a standard Tetrahydrofuran (THF) Insolubles test. To obtain the percent of THF Insolubles of a polyurethane, 1 gram of the polyurethane dispersion is mixed with 30 grams of THF in a pre-weighed centrifuge tube. The solution is centrifuged for 2 hours at 17,000 rpm before the top liquid layer is poured out leaving behind a non-dissolved gel at the bottom. The centrifuge tube with the non-dissolved gel is re-weighed, after the tube is dried in an oven for 2 hours at 110° C. The percent of THF insolubles of the polyurethane is calculated using the equation below:

$$\% \ THF \ \text{Insolubles} = \frac{\text{Weight of Tube and Non Dissolved Gel-Weight of Tube}}{\text{Sample Weight} * \text{Polyurethane Solid} \%} * 100$$

The higher the percent of THF Insolubles of a polyurethane, the higher the amount of cross-linking of the polyurethane.

The upper limit of cross-linking of a polyurethane is related to the ability of the polyurethane to form a stable aqueous dispersion. As long as a cross-linked polyurethane has adequate ionic functionality to make it stable when inverted into water, the corresponding level of cross-linking is deemed acceptable and will lead to an improved ink jet ink for textiles. The emulsion/dispersion stability of the cross-linked polyurethane can also be improved by adding dispersants or emulsifiers. The upper limit of cross-linking as measured by the THF Insolubles test is about 90%, although more typically the upper limit is about 60%.

The lower limit of cross-linking of a polyurethane is about 1% or greater, typically about 4% or greater, and more typically about 10% or greater, as measured by the THF Insolubles test.

Combinations of two or more cross-linked polyurethanes (either combined into a single binder additive, or as separate binder additives) may also be utilized in the formulation of an ink.

Further details about cross-linking of polyurethane binders and their use in aqueous ink-jet inks can be found in U.S. Patent Application Publication No. 20050182154.

Mixing of Anionic and Non-Ionic Binders

It has been found that an ink jet ink comprising both a non-ionic binder and anionic polyurethane provide high color density and saturation relative to inks comprising only anionic polyurethane. Furthermore, an ink-jet ink containing both a non-ionic and anionic polymer provides a printed image with superior wash fastness when printing via an ink jet printing process.

The binder is typically present in an ink in an amount of at least 0.2% by weight based on the total weight of the ink. Typically, the ratio of the anionic polymeric binder to the non-ionic polymeric binder is between 1:0.05 and 0.05:1 by weight. More typically, the ratio of the anionic polymeric binder to the non-ionic polymeric binder is between 1:0.1 and 0.1:1 by weight.

Colorants

A wide variety of organic and inorganic pigments, alone or in combination, may be dispersed with a polymeric dispersant to prepare an ink, especially an ink-jet ink. The term "pigment" as used herein means an insoluble colorant that requires to be dispersed with a dispersant and processed under dispersive conditions in the presence of a dispersant. The colorant also includes dispersed dyes. The dispersion process results in a stable dispersed pigment. The pigment particles are sufficiently small to permit free flow of the ink through the ink-jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron and, most typically, from about 0.005 to about 1 micron. The average particle size as measured by dynamic light scattering is less than about 500 nm, typically less than about 300 nm.

The selected pigment(s) may be used in dry or wet form. For example, pigments are usually manufactured in aqueous media, and the resulting pigments are obtained as a water-wet presscake. In presscake form, the pigment does not agglomerate to the extent like it is in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in ink-jet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in *The Color Index*, Third Edition, 1971.

The pigment of the present disclosure can also be a self-dispersing (or self-dispersible) pigment. The term self-dispersing pigment (or "SDP") refers to pigment particles whose surface has been chemically modified with hydrophilic, dispersability-imparting groups that allow the pigment to be stably dispersed in an aqueous vehicle without a separate dispersant. "Stably dispersed" means that the pigment is finely divided, uniformly distributed and resistant to particle growth and flocculation.

The SDPs may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. Nos. 5,554,739 and 6,852,156.

The SDPs may be black, such as those based on carbon black, or may be colored pigments. Examples of pigments with coloristic properties useful in ink-jet inks include: Pigment Blue 15:3 and Pigment Blue 15:4 (for cyan); Pigment Red 122 and Pigment Red 202 (for magenta); Pigment Yellow 14, Pigment Yellow 74, Pigment Yellow 95, Pigment Yellow 110, Pigment Yellow 114, Pigment Yellow 128 and Pigment Yellow 155 (for yellow); Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264 (for red); Pigment Green 1, Pigment Green 2, Pigment Green 7 and Pigment Green 36264 (for green); Pigment Blue 60, Pigment Violet 3, Pigment Violet 19, Pigment Violet 23, Pigment Violet 32, Pigment Violet 36 and Pigment Violet 38 (for blue); and carbon black. However, some of these pigments may not be suitable for preparation as SDP. Colorants are referred to herein by their "C.I." designations established by Society Dyers and Colourists, Bradford, Yorkshire, UK and published in *The Color Index*, Third Edition, 1971.

The SDPs of the present disclosure may have a degree of functionalization wherein the density of anionic groups is less than about 3.5 µmoles per square meter of pigment surface (3.5 µmol/m$^2$), and more specifically, less than about 3.0 µmol/m². Degrees of functionalization of less than about 1.8 µmol/m², and more specifically, less than about 1.5 µmol/m², are also suitable and may be preferred for certain specific types of SDPs.

The range of useful particle size after dispersion is typically from about 0.005 um to about 15 um. Typically, the pigment particle size should range from about 0.005 um to about 5 um; and, specifically, from about 0.005 um to about 1 um. The average particle size as measured by dynamic light scattering is less than about 500 nm, typically less than about 300 nm.

The amount of pigment present in the ink is typically in the range of from about 0.1% to about 25% by weight, and more typically in the range of from about 0.5% to about 10% by weight, based on the total weight of ink. If an inorganic pigment is selected, the ink will tend to contain higher percentages by weight of pigment than with comparable inks employing organic pigment, since inorganic pigments generally have higher densities than organic pigments.

Polymeric Dispersant

A typical polymeric dispersant is a polyurethane polymer. Polyurethane polymers are, for the purposes of the present disclosure, polymers wherein the polymer backbone contains urethane linkage derived from the reaction of an isocyanate group (from, e.g., a di- or higher-functional monomeric, oligomeric or polymeric polyisocyanate) with a hydroxyl group (from, e.g., a di- or higher-functional monomeric, oligomeric or polymeric polyol). Such polymers may, in addition to the urethane linkage, also contain other isocyanate-derived linkages such as urea, as well as other types of linkages present in the polyisocyanate components or polyol components (such as, for example, ester and ether linkage).

The polyurethane dispersant can also be cross-linked in a fashion similar to the cross-linking of anionic polyurethane binder disclosed above.

Ink Vehicle

The ink of the present disclosure comprises an ink vehicle, typically an aqueous ink vehicle, also known as aqueous vehicle or aqueous carrier medium.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are $C_4$-$C_6$ alkanediols with 1,2-hexanediol being most typical. Suitable surfactants include ethoxylated acetylene diols (e.g., Surfynol® series commercially available from Air Products), ethoxylated alkyl primary alcohols (e.g., Neodol® series commercially available from Shell) and secondary alcohols (e.g., Tergitol® series commercially available from Union Carbide), sulfosuccinates (e.g., Aerosol® series commercially available from Cytec), organosilicones (e.g., Silwet® series commercially available from Witco) and fluoro surfactants (e.g., Zonyl® series commercially available from DuPont).

The amount of glycol ether(s) and 1,2-alkanediol(s) added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even more advantageously, less than about 3.5 mPa·s.

Other Ingredients

Other ingredients, additives, may be formulated into the ink-jet ink, to the extent that such other ingredients do not interfere with the stability and jettability of the ink jet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid)

(EDDHA), nitrilotriacetic acid (NTA), dihydroxyethylglycine (DHEG), trans-1,2-cyclohexanediaminetetraacetic acid (CyDTA), diethylenetriamine-N,N,N',N",N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

The ink-jet ink may contain other ingredients as are well known in the art. For example, anionic, non-ionic, cationic or amphoteric surfactants may be used. In aqueous inks, the surfactants are typically present in the amount of about 0.01 to about 5%, and preferably about 0.2 to about 2%, based on the total weight of the ink.

Co-solvents, such as those exemplified in U.S. Pat. No. 5,272,201 (incorporated by reference herein for all purposes as if fully set forth) may be included to improve pluggage inhibition properties of the ink composition.

Certain reagents can be used as additives to an ink-jet ink to effect post printing curing. Post printing curing is often facilitated by heating of the sample after it is printed. Example of suitable post printing curing agents include amide and amine-formaldehyde resin, phenolic resins, urea resins and blocked polyisocyanate. The selected post printing curing agent should be soluble or dispersible in an ink. Inks containing a mixture of the anionic and non-ionic binders and the selected post printing curing agents are stable in storage, which means no curing reaction took place before printing. Only after the ink is printed and when the printed image is fused with heat and optionally pressure, that the post printing curing agent undergoes chemical reaction with the one or more of the binders, dispersant, ink vehicle, substrate, etc. A specific example of post printing curing agent is Cymel® 303 ULF, from Cytec, West Patterson, N.J.

Biocides may be used to inhibit growth of microorganisms.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Inks of the present disclosure can also achieve the beneficial durable properties of wash fastness.

Ink Sets

The term "ink set" refers to all the individual inks or other fluids an ink jet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. The magenta, yellow and cyan inks of the ink set are typically aqueous inks, and may contain dyes, pigments or combinations thereof as the colorant. Such other inks are, in a general sense, well known to those of ordinary skill in the art.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. These "gamut-expanding" inks are particularly useful in textile printing for simulating the color gamut of analog screen printing, such as disclosed in U.S. Patent Application Publication No. 20030128246.

A typical ink set may contain a white ink to be printed as an undercoat before color inks containing mixture of waterborne anionic and non-ionic polymeric binders.

The inks and ink sets can be used to print on many substrates including paper, especially colored papers, packaging materials, textiles and polymer substrates.

A particularly advantageous use of the inks and ink sets of the present disclosure is in the ink jet printing of textiles. Textiles include, but are not limited to, cotton, wool, silk, nylon, polyester and the like, and blends thereof. The finished form of the textile includes, but is not limited to, fabrics, garments, t-shirts, furnishings such as carpets and upholstery fabrics, and the like. Additionally, fibrous textile materials that come into consideration are especially hydroxyl-group-containing fibrous materials, including natural fibrous materials such as cotton, linen and hemp, and regenerated fibrous materials such as viscose and lyocell. Further fibrous materials include wool, silk, polyvinyl, polyacrylonitrile, polyamide, aramide, polypropylene and polyurethane. These fibrous materials are typically in the form of sheet-form textile woven fabrics, knitted fabrics or webs.

The textile material can be pretreated with, for example, an inorganic salt solution prior to digitally printing. A typical pretreatment is an aqueous multivalent cationic salt solution disclosed in U.S. Patent Application Publication No. 20070056118, the disclosure of which is incorporated by reference herein for all purposes as if fully set forth.

Another typical pretreatment is a solution of a multivalent cation salt, such as calcium chloride, calcium nitrate or calcium nitrate tetrahydrate. A 20 wt % calcium nitrate tetrahydrate solution can be effectively used. The treatment can utilize any means such as spraying, dipping, padding to apply the pretreatment solution.

Typically, the pretreatment solution is applied to the fabric by spraying from about 0.20 to about 7.5 grams of multivalent cationic (calcium) salt per 100 grams of fabric, more typically from about 0.60 to about 6.0 grams of multivalent cationic (calcium) salt per 100 grams of fabric, and still more typically from about 0.75 to about 5.0 grams of multivalent cationic (calcium) salt per 100 grams of fabric.

The printed textiles may optionally be post processed with heat and/or pressure, such as disclosed in U.S. Patent Application Publication No. 20030160851, the disclosure of which is incorporated by reference herein for all purposes as if fully set forth.

Upper temperature is dictated by the tolerance of the particular textile being printed. Lower temperature is determined by the amount of heat needed to achieve the desired level of durability. Generally, fusion temperatures will be at least about 80° C. and preferably at least about 140° C., more preferably at least about 150° C. and most preferably at least about 160° C.

Fusion pressures required to achieve improved durability can be very modest. Thus, pressures can be about 3 psig, preferably at least about 5 psig, more preferrable at least about 8 psig and most preferably at least about 10 psig.

Fusion pressures of about 30 psig and above seem to provide no additional benefit to durability, but such pressures are not excluded.

The duration of fusion (amount of time the printed textile is under pressure at the desired temperature) is not believed to be particularly critical. Most of the time in the fusion operation generally involves bringing the print up to the desired temperature. Once the print is fully up to temperature, the time under pressure can be brief (seconds).

A white ink can be digitally printed as a background (undercoat or underprinting) for an image prior to putting the digitally printed image on the textile, and/or as part of the image. When printed as an undercoat, the white ink can enhance the coloring of the image. For a colored textile, digitally preprinting a white undercoat can be particularly useful. A typical white ink is disclosed in U.S. Patent Application Publication No. 20070060670, the disclosure of which is incorporated by reference herein for all purposes as if fully set forth.

When printing on textiles, the white ink can also provide other benefits. Often when textiles are printed, the ink will feather into the textile giving an indistinct boundary. The white ink could be used to print a small, imperceptible boundary to a design and make it appear to have a distinct boundary.

Criteria for a successful digitally printed textile include bright representative coloring, adequate hand feel, good durability relative to wash fastness and crock of the printed image. The ink of the present disclosure can be used by itself or within an ink set to provide these advantages.

The following examples illustrate the present disclosure without, however, being limited thereto.

Examples

Solid Content Measurement

Solid content for the solvent free polyurethane dispersions was measured with a moisture analyzer, Model MA50 from Sartorius. For polyurethane dispersions containing a high boiling solvent, such as NMP, tetraethylene glycol dimethyl ether, or sulfolane, the solid content was determined by the weight difference before and after baking in an oven set at 150° C. oven for 180 minutes.

Preparation of Cross-Linked Anionic Polyurethane Dispersion PUD-A as a Binder

To a dry, alkali- and acid-free flask, equipped with an addition funnel, a condenser, stirrer and a nitrogen gas line were added 699.2 g of Desmophene C 1200, a polyester carbonate diol supplied by Bayer, 280.0 g acetone and 0.06 g of DBTL. The contents were heated to 40° C. and thoroughly mixed. To the mixture was added 189.14 g of IPDI via the addition funnel at 40° C. over a period of 60 min. The residual IPDI in the addition funnel was rinsed into the flask with 15.5 g of acetone.

The flask temperature was raised to 50° C. and held at that temperature for 30 minutes. To the flask were added 44.57 g of DMPA, followed by 25.2 g of TEA via the addition funnel, which was then rinsed with 15.5 g of acetone. The flask temperature was subsequently raised again to 50° C. and held at 50° C. until the NCO % reached 1.23% or less.

While maintaining the temperature at 50° C., 1498.0 g of deionized (DI) water was added over 10 minutes, followed by a mixture of 97.5 g of EDA (as a 6.25% solution in water) and 29.7 g of TETA (as a 6.25% solution in water) over 5 minutes, via the addition funnel, which was then rinsed with 80.0 g of water. The mixture was held at 50° C. for 1 h before cooling to room temperature.

Acetone (~310.0 g) was removed under vacuum, leaving a final dispersion of polyurethane (PUD-A) with about 35.0% of solids by weight.

Preparation of Polyurethane Dispersant PUD-B as a Dispersant for Colorant

To a dry, alkali- and acid-free flask equipped with an additional funnel, a condenser and a stirrer, under a nitrogen atmosphere were added Terathane® 650 (300 g), DMPA (180 g), Sulfolane (876 g) and DBTL (0.12 g). The resulting mixture was heated to 60° C. and thoroughly mixed. To this mixture was added IPDI (437.5 g) via the additional funnel followed by rinsing any residual IPDI in the additional funnel into the flask with Sulfolane (15 g). The temperature for the reaction mixture was raised to 100° C. and maintained at 100° C. until the isocyanate content reached 1.0% or below. The temperature was then cooled to 60° C. and maintained at 60° C., while BMEA (46 g) was added via the additional funnel mounted on the flask over a period of 5 minutes. The residual BMEA in the additional funnel was rinsed into the flask with Sulfolane (5 g). After holding the temperature for 1 h at 60° C., aqueous KOH (1755 g, 3% by weight) was added over a period of 10 minutes via the additional funnel followed by de-ionized water (135 g). The mixture was maintained at 60° C. for 1 h and cooled to room temperature to provide a polyurethane dispersant (PUD-B) with 25% of solids.

Preparation of Pigmented Cyan Dispersion

Pigmented dispersions were prepared using TAB-2, a cyan pigment from Dainichiseika.

The following procedure was used to prepare pigmented dispersions with PUD-B. Using a Buhler Mill, a premix was prepared at typically 20-30% pigment loading and the targeted dispersant level was selected at a pigment/dispersant (P/D) ratio of 1.5-6.0. A P/D of 2.5 corresponds to a 40% dispersant level on pigment. Optionally, a co-solvent was added at 10% of the total dispersion formulation to facilitate pigment wetting and dissolution of dispersant in the premix stage and for ease of grinding during milling stage. Although other similar co-solvents are suitable, TEB was the co-solvent of choice. PUD-B was pre-neutralized with KOH to facilitate solubility and dissolution in water. During the premix stage, the pigment level was maintained at typically 27%, and was subsequently reduced to about 24% during the milling stage by the addition of de-ionized water for optimal media mill grinding conditions. After completion of the milling stage, which was typically 4 hours, the remaining letdown of de-ionized water was added and thoroughly mixed.

All the pigmented dispersions processed with co-solvent were purified using an ultrafiltration process to remove co-solvent(s) and filter out other impurities that may be present. After completion, the pigment levels in the dispersions were reduced to about 10 to 15%.

In the cross-linking step, a cross-linking compound, Denacol® 321, was mixed with the cyan pigmented dispersion, and heated between 60° C. and 80° C. with efficient stirring for 6 to 8 hours. After the cross-linking reaction was completed, the pH was adjusted to at least about 8.0 if needed, and was optionally purified again with additional ultrafiltration process.

Preparation of Inks

Inks used in the examples were made according to standard procedures in the ink jet art. Ingredient amounts are weight percent based on the weight of the final ink. Polyurethane binders and colorants are quoted on a solids basis. A listing of ink ingredients is listed in Table 1 below.

TABLE 1

| Ingredients | % (based on solid weight) |
|---|---|
| Cyan dispersion | 3.00 |
| Ethylene Glycol | 13.00 |
| Diethylene Glycol | 5.00 |
| 1,2-hexanediol | 0.30 |
| Cymel ®303 ULF | 3.0 |
| Cycat ®* | 0.50 |
| Total Amount of Binder | 6.00 |
| Byk ® 348 | 0.50 |
| Surfynol ® 440 | 0.80 |
| Water | Balance to 100% |

*A catalyst from Cytec

As an example of ink preparation, the ink vehicle was prepared and added with stirring to a binder or a mixture of binders. After stirring until a homogeneous mixture was obtained, the solution was added to the cyan pigment dispersion and stirred for another 3 h, or until a homogeneous ink dispersion was obtained.

Ink-1 was prepared including only anionic binder PUD-A. Ink-2 was prepared using non-ionic binder PrintRite® D375. Ink-3 and Ink-4 were prepared using a mixture of anionic and non-ionic binders as listed in Table 2 below.

TABLE 2

| Binder (% based on solid weight) | Ink-1 (Comp.) | Ink-2 (Comp.) | Ink-3 | Ink-4 |
|---|---|---|---|---|
| PUD-A | 6.00 | — | 4.00 | 4.00 |
| PrintRite ® D375 | — | 6.00 | 2.00 | — |
| PrintRite ® 594 | — | — | — | 2.00 |

Salt Stability Test

A series of aqueous salt (typically NaCl) test solutions with different concentrations are prepared. Approximately 1.5 ml (about 1.5 g) of each salt test solution is added to a small glass vial.

Two drops of an ink are added to each of the small glass vial containing salt test solutions, and gently mixed. One drop would typically weigh about 0.04 g. Based on a typical ink containing about 10 wt % of total solids, the weight of solids from the concentrate would be about 0.008 g in about 1.5 g of the aqueous salt test solution, or about 0.5% by weight based on the weight of the aqueous salt test solution.

It should be noted that the 0.5% by weight number derived above is not critical for the application of the salt stability test, but can be used as a standard point if desired. For the inks of the present disclosure, two drops are used for the salt stability test, although one drop may be used if the ink has higher solids concentrations.

The mixtures of an ink in aqueous salt test solutions above were allowed to sit undisturbed for 24 hours at room temperature. The stability of the samples was visually rated based on the following criteria:

Rating of 3: complete settling of pigment; transparent, uncolored liquid at top.
Rating of 2: no transparent uncolored liquid layer; definite settling onto bottom of vial observed when vial is tilted.
Rating of 1: no transparent uncolored liquid layer; very slight settling (small isolated spots) as observed during tilting of vial.
Rating of 0: no evidence of any settling.

The salt concentration where settling is clearly observed (a rating of 2 or 3) is taken as the critical concentration for the ink to flocculate. It can be inferred from this test that, with an increasing critical flocculation concentration, the role of steric stabilization from non-ionic nature of the polymer becomes more dominant and electrostatic stabilization from ionic nature of the polymer becomes less significant.

The typical salts for the aqueous salt test solutions are lithium, sodium or potassium salts.

Salt Stability Test Results of the Cyan Inks

All 4 inks Ink-1 through Ink-4 were subjected to the Salt Stability Test described above, and results are summarized in Table 3 below. Ink-1, containing only an anionic binder, was found to be the least salt stable. Ink-2, containing only a non-ionic binder, was found to be the most salt stable. Ink-3 and Ink-4, containing a blend of anionic and non-ionic binders, showed good salt stability.

TABLE 3

| NaCl Concentration (M) | Salt Stability | | | |
|---|---|---|---|---|
| | Ink-1 | Ink-2 | Ink-3 | Ink-4 |
| 0.1 | 0 | 0 | 0 | 0 |
| 0.2 | 0 | 0 | 0 | 0 |
| 0.3 | 0 | 0 | 0 | 0 |
| 0.4 | 0 | 0 | 0 | 0 |
| 0.5 | 0 | 0 | 0 | 0 |
| 0.6 | 0 | 0 | 0 | 0 |
| 0.7 | 3 | 0 | 0 | 2 |
| 0.8 | 3 | 0 | 1 | 3 |
| 0.9 | 3 | 0 | 2 | 3 |
| 1.0 | 3 | 0 | 3 | 3 |

Printing and Testing Techniques

Ink-1 through Ink-4 were printed on Hanes Heavyweight 100% cotton black t-shirt. Before printing, the shirts were sprayed with DuPont Artistri® P5001 pretreatment solution. The pretreated shirts were pressed for drying using a George Knight Digital Swing Away DK20S Heat Press for 30 seconds at 165° C. with medium pressure. The dried t-shirts were first printed with DuPont Artistri® P5910 white pigmented ink using the Flexijet DTG printer from All American Screen as the underprinted white image. Cyan Inks 1-4 were then printed immediately after the white ink was printed. The finished shirts were dried again with the DK20S Heat Press for 90 seconds at 165° C. with medium pressure.

To measure the wash fastness of the printed image, the printed t-shirts were subject to three cycles of laundering and the color properties were measured and compared before and after the washing. Colorimetric measurements were done using Minolta Spectrophotometer CM-3600d using Spectra Match software.

Delta E is determined from L, a*, and b* color measurements according to the following equation:

$$\text{Delta } E = [(L_1 - L_w)^2 + (a^*_1 - a^*_w)^2 + (b^*_1 - b^*_w)^2]^{1/2}$$

where $L_1$, $a^*_1$, and $b^*_1$ are initial color measurements and $L_w$, $a^*_w$, and $b^*_w$ are color measurements after washing. L, a*, and b* are color scale axes that are conventionally used to describe the degree of lightness, i.e. black/white (L), red/green (a*), and blue/yellow (b*) in an image. One of ordinary skill in the printing art would know how to interpret the Delta E values presented herein, but for the sake of comparison, a Delta E of from about 2 to 5 would be acceptable to an untrained eye without a control for comparison, and a Delta E of less than about 1.5 would not be detectable to the human eye.

TABLE 4

| Ink Properties | Ink-1 (comp.) | Ink-2 (comp.) | Ink-3 | Ink-4 |
|---|---|---|---|---|
| Optical density (OD) | 0.93 | 1.46 | 1.4 | 1.1 |
| Delta E | 2.5 | 9.5 | 2.5 | 6.0 |

The OD and wash fastness results of Ink-1 through Ink-4 are summarized in Table 4 above. Comparative Ink-1, containing only anionic polyurethane, gave good wash fastness, but unacceptable OD. Comparative Ink-2, containing only non-ionic polyurethane, gave good OD, but a high value of delta E indicating unacceptable washing resistance. The inventive Ink-3 and Ink-4, containing blends of anionic polyurethane and non-ionic polyurethane dispersions, gave improved OD (compared to Ink-1) with smaller Delta E (compared to Ink-2) for good wash fastness.

What is claimed is:

1. An aqueous ink-jet ink having improved salt stability comprising an aqueous vehicle, a colorant, and a mixture of a water-borne anionic polymeric binder and a water-borne non-ionic polymeric binder, wherein said anionic polymeric binder is a polyurethane, and said non-ionic polymeric binder is selected from the group consisting of polyurethane, polyethylene-vinylacetate, acrylics, polyamide, polystyrene-acrylate, and mixtures thereof.

2. The ink of claim 1, wherein said non-ionic polymeric binder is polyurethane.

3. The ink of claim 2, wherein said anionic polymeric binder is cross-linked with a cross-linking agent.

4. The ink of claim 3, further comprises a polymeric dispersant.

5. The ink of claim 4, wherein said polymeric dispersant is polyurethane.

6. The ink of claim 5, wherein said ink is printed onto textile.

7. The ink of claim 6, wherein said textile is treated by a pre-treatment fluid.

8. The ink of claim 7, wherein said ink is under-printed with a white ink.

9. The ink of claim 3, wherein the ratio of said anionic polymeric binder to said non-ionic polymeric binder is between 1:0.05 and 0.05:1 by weight.

10. The ink of claim 9, wherein the ratio of said anionic polymeric binder to said non-ionic polymeric binder is between 1:0.1 and 0.1:1 by weight.

11. The ink of claim 1, wherein said non-ionic polymeric binder is acrylics.

12. The ink of claim 11, wherein said anionic polymeric binder is cross-linked with a cross-linking agent.

13. The ink of claim 12, further comprises a polymeric dispersant.

14. The ink of claim 13, wherein said polymeric dispersant is polyurethane.

15. The ink of claim 14, wherein said ink is printed onto textile.

16. The ink of claim 15, wherein said textile is treated by a pre-treatment fluid.

17. The ink of claim 16, wherein said ink is under-printed with a white ink.

18. The ink of claim 11, wherein the ratio of said anionic polymeric binder to said non-ionic polymeric binder is 1:0.05 and 0.05:1 by weight.

19. The ink of claim 18, wherein the ratio of said anionic polymeric binder to said non-ionic polymeric binder is 1:0.1 and 0.1:1 by weight.

20. An aqueous ink-jet ink having improved salt stability comprising an aqueous vehicle, a colorant, and a mixture of a water-borne anionic polymeric binder and a water-borne non-ionic polymeric binder, wherein said anionic polymeric binder is a polyurethane, said non-ionic polymeric binder is selected from the group consisting of polyurethane, polyethylene-vinylacetate, acrylics, polyamide, polystyrene-acrylate, and mixtures thereof, and wherein the ratio of said anionic polymeric binder to said non-ionic polymeric binder is between 1:0.1 and 0.1:1 by weight.

21. An aqueous ink-jet ink having improved salt stability comprising an aqueous vehicle, a colorant, and a mixture of a water-borne anionic polymeric binder and a water-borne non-ionic polymeric binder, wherein said anionic polymeric binder is a polyurethane and is stabilized by anionic moiety only, and said non-ionic polymeric binder is selected from the group consisting of polyurethane, polyethylene-vinylacetate, acrylics, polyamide, polystyrene-acrylate, and mixtures thereof.

* * * * *